July 22, 1958
G. P. McCORD ET AL
2,844,183
VALVE FOR TUBELESS TIRE
Filed Dec. 24, 1953
2 Sheets-Sheet 1
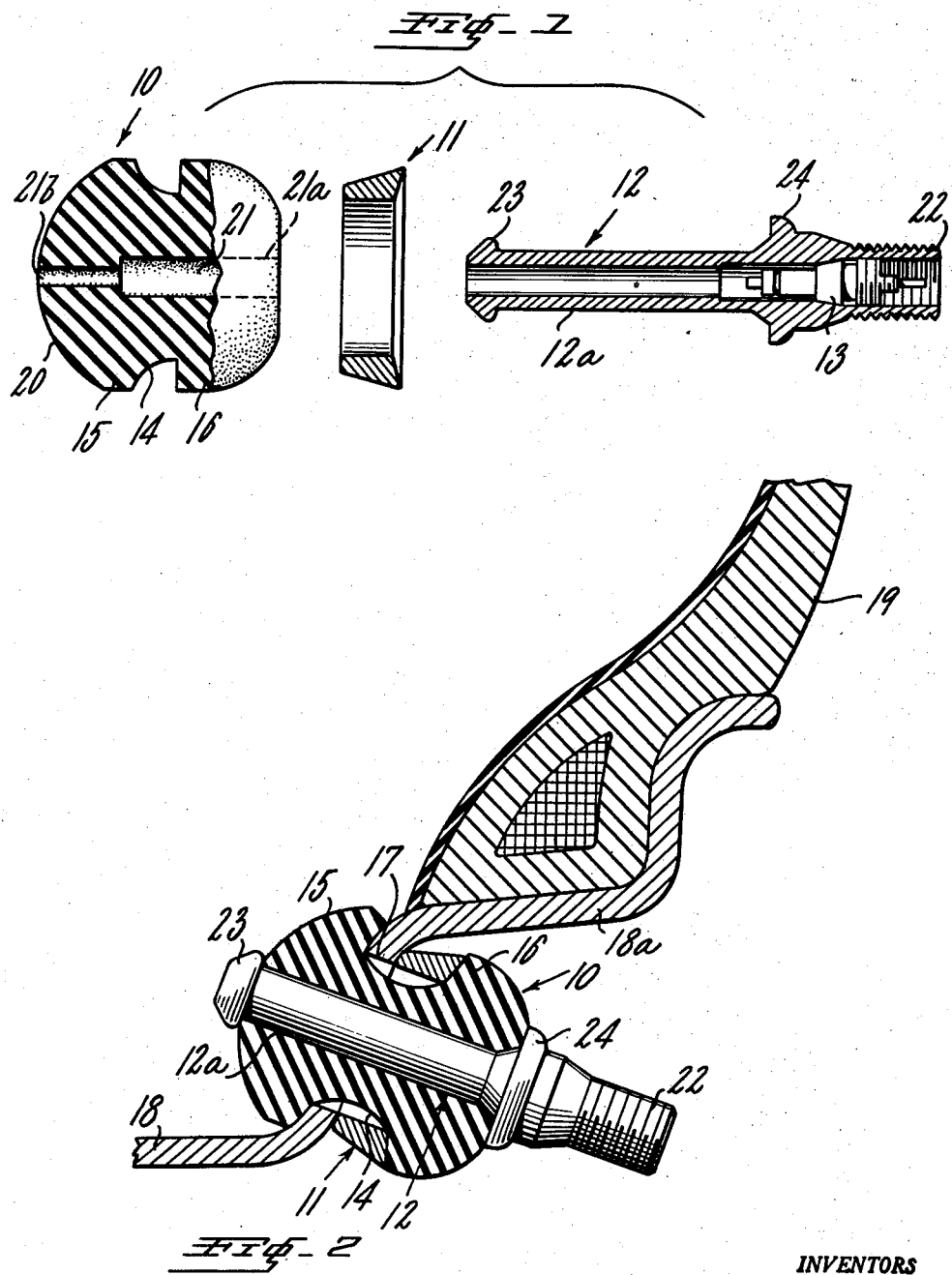
INVENTORS
GEORGIE P. McCORD
ALFRED N. IKNAYAN
BY
*Irwin M. Lewis*
ATTORNEY July 22, 1958 G. P. McCORD ET AL 2,844,183
VALVE FOR TUBELESS TIRE
Filed Dec. 24, 1953 2 Sheets-Sheet 2
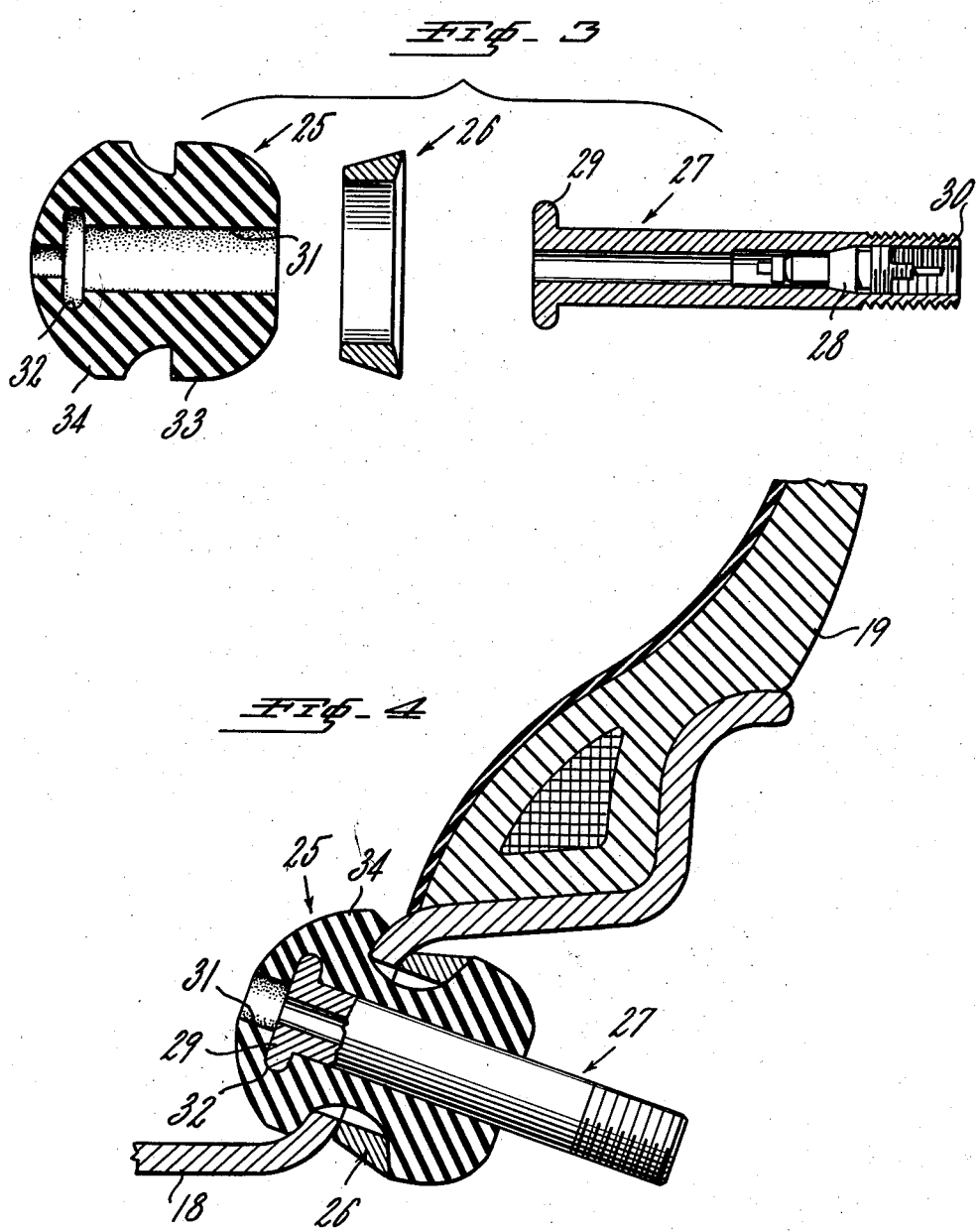
INVENTORS
GEORGIE P. McCORD
ALFRED N. IKNAYAN
BY Irwin M. Lewis
ATTORNEY

United States Patent Office 2,844,183
Patented July 22, 1958

2,844,183

VALVE FOR TUBELESS TIRE

Georgie P. McCord, Oaklandon, Ind., and Alfred N. Iknayan, Grosse Pointe Farms, Mich., assignors to United States Rubber Company, New York, N. Y., a corporation of New Jersey Application December 24, 1953, Serial No. 400,162

7 Claims. (Cl. 152—427)

This invention relates to a valve stem assembly for a tubeless tire and rim assembly.

A tubeless tire, as the name implies, requires no inner tube. The tire casing and the rim form the air container. An air tight seal is effected between the tire casing and the rim by the pressure of the beads of the tire against the flanges of the rim. Integral rubber ribs are commonly provided on the beads to increase the effectiveness of the seal. There being no inner tube the valve stem is commonly secured in an opening provided through the rim.

The valve assembly of the present invention includes an elastic rubber cover or casing and a rigid tubular insert which is received in a passageway through the casing and which in turn is adapted to receive a conventional spring type check valve, commonly called a valve core. The elastic rubber casing or cover and the tubular insert are so constructed as to effectively and efficiently utilize, when assembled with a special spacer ring, the inherent elasticity of the rubber casing to clamp and anchor the valve stem assembly in the valve stem opening provided through the rim of the tubeless tire and to effect a fluid tight seal between the rubber casing and the rim and between the rubber casing and the tubular insert.

Among the advantages of the valve stem asembly of the present invention are ease of attachment to and disattachment from the rim, cheapness, simplicity, lightness and the ability to withstand blows without damage. In addition, the valve has the advantage of eliminating the inherent problems of effecting a bond between the rubber casing and the rigid insert to provide a fluid-tight seal therebetween, as the fluid-tight seal is effected by the inherent elasticity of the rubber casing. The advantage of the provision of a rigid tubular insert and a conventional valve core is that the stem can be used with conventional inflating devices without resort to special auxiliary devices such as inflating needles such as is necessary in the use of all rubber valves.

Other objects and advantages of the present invention will become apparent from the following description when read in conjunction with the accompanying drawings wherein:

Fig. 1 is an exploded, sectional view of one modification of the valve stem assembly of the present invention;

Fig. 2 is a partial sectional view of a tubeless tire and rim assembly showing the valve stem assembly of Fig. 1 secured in the rim opening through the rim;

Fig. 3 is an exploded, sectional view of another modification of the valve assembly of the present invention, and Fig. 4 is a partial sectional view of a tubeless tire and rim assembly showing the valve stem assembly of Fig. 3 secured in the rim opening through the rim.

Referring to the drawings and in particular to Fig. 1 of the drawing, the valve assembly of the present invention includes a substantially cylindrical elastic rubber casing or cover 10, a rigid annular spacer ring 11, and a rigid tubular insert 12. The insert may be made of any suitable material such as metal, hard rubber, or plastic. A conventional spring type check valve 13, commonly referred to as a valve core is threadedly secured in the end of the tubular insert 12. The valve core 13 is of conventional construction well known to those skilled in the art and the details thereof form no part of the present invention.

The casing 10 is made of a resilient, elastic, readily deformable rubber. As used herein the term rubber is intended to include natural or synthetic rubber or blends thereof. A circumferentially extetnding groove 14 is provided in the exterior surface of the casing 10 intermediate its ends to thereby provide retaining flanges 15 and 16 which, when the casing 10 is inserted through a valve stem opening 17 through the rim 18 of a tubeless tire 19, as shown in Fig. 2, are disposed on opposite sides of the rim. The outer diameters of the flanges 15 and 16 are substantially larger than the opening 17 but they may be deformed sufficiently by reason of their elasticity to permit insertion of the casing 10 through the opening 17 as will hereinafter be described in detail. The end of the flange 15 is rounuded at 20 to facilitate the insertion thereof through the opening 17.

The casing 10 is provided with a passageway 21 which extends axially therethrough. The passageway 21 is larger in diameter adjacent the outer end 21a than at the inner end 21b to facilitate the insertion of the insert 12 therethrough. The inner end 21b is made smaller to increase the effectiveness of the fluid-tight seal between the casing 10 and insert 12 as will hereinafter be described.

The insert 12 is threaded externally at its outer end 22 to receive a conventional dust cap (now shown) and is threaded internally to receive the threaded valve core 13 as above described. The insert 12 is provided with two longitudinally spaced integral, externally extending flanges 23 and 24 which engage the outer ends of the surfaces of the flanges 15 and 16 of the casing 10 as shown in Fig. 2 when the insert 12 is assembled with the casing 10. While the primary function of the flanges 23 and 24 is to anchor the insert 12 within the casing 10, they also provide some sealing function as is hereinafter described in detail. The flange 23 is tapered at the outer end thereof to facilitate the insertion thereof through the passageway 21 of the casing 10. The shank portion 12a of the insert 12 extending between the flanges is slightly larger in diameter than the maximum diameter of the passageway 21 through the casing 10.

The annular spacer ring 11 is formed of a rigid material such as metal, hard plastic or wood, and is of substantial axial length. Spacer ring 11 has an inner diameter approximately equal to or slightly less than the minimum diameter of the groove and is adapted to seat in the groove 14 as shown in Fig. 2. The axial thickness of the spacer 11 is such that the total thickness of the ring 11 and the rim 18 is substantially greater than the width of the groove 14 so that the casing 10 is materially stretched when the valve is assembled in the rim opening 17 as shown in Fig. 2. This places the rubber flanges 15 and 16 under considerable compression so that flange 15 presses tightly against the surface of the rim 18 surrounding the opening 17 and tightly against the flange 23 of the insert 12 and tightly against the shank of the insert 12 adjacent the flange 23 and so that flange 16 presses tightly against the flange 24 of the insert 12 and tightly against the shank of the insert 12 adjacent the flange 24 to thereby effect fluid-tight seals at these points. The reduction in diameter of the passageway 21 at 21b enhances the effectiveness of the seal thereof with the shank of the insert 12. In addition to providing a sealing action, the stressed condition of the casing 10 serves to securely anchor the casing 10 within the valve stem opening 17. The spacer ring 11 is tapered as shown in the drawing to provide a wide base at the end thereof which engages the flange 16 and to provide sufficient clearance at the other end with the outwardly extending flange portion 18a of the rim 18. As best shown in Fig. 2, the groove 14 of the casing 10 is made sufficiently deep that when the valve is installed in the rim opening 17, the bottom or base of the groove 14 will clear the edge of the opening 17. This prevents the casing 10 from being subjected to radial compression which would decrease the tension of the stretched casing 10 and thereby decrease the compression of the flanges 15 and 16 and the sealing effected thereby.

In assembling and applying the valve to the rim the spacer ring 11 is first placed over the casing 10 until it seats in the groove 14. This may be done manually due to the elasticity of the flanges 15 and 16. The casing 10 is next inserted into the opening 17 in the rim 18 until the flange 15 is deposed on the opposite side thereof as shown in Fig. 2. Preferably the flange 15 of the casing 10 is pushed through the opening 17 by inserting a blunt ended rod into the passageway 21 until the end thereof seats on the shoulder formed between the section 21a of larger diameter and 21b of smaller diameter and then placing the rounded end over the opening 17 and applying a force to the rod. To facilitate the insertion of the casing 10, the casing may be lubricated with a suitable rubber lubricant such as vegetable oil soap. As the flange 15 is pushed through the opening 17, the spacer ring 11 engages the surface of the rim 18 around the opening 17 and the casing is stretched axially and retained in the stretched condition by the flanges 15 and 16. The degree of stretching is dependent on the axial thickness of the spacer ring 11 and the thickness of the ring 11 may be chosen to give the desired degree of stretching. The insert 12 is next inserted through the passageway 21 until the flange 23 emerges from the end of the passageway and engages the exterior surface of the flange 15 surrounding the opening 21. The insert 12 may be lubricated but it is not necessary.

The flanges 15 and 16 of the casing 10 being under compression due to the stretched condition of the casing 10, press tightly against the shank 12a and flanges 23 and 24 of the insert 12 and effect a fluid-tight seal between the insert 12 and the casing 10 without the necessity of effecting a bond therebetween.

In Figs. 3 and 4, there is shown a modified form of the invention. This modification is of essentially the same structure as that of Figs. 1 and 2 and includes a casing 25, spacer ring 26, tubular insert 27, and check valve or core 28. The tubular insert 27, however, is provided with only a single flange 29 at the end thereof opposite from the outer valve core receiving end 30. The passageway 31 through the casing 25 is provided with an annular groove 32 adjacent the inner end thereof into which the flange 29 is received when the insert 27 is inserted in the passageway 31. The reception of the flange 29 in the groove 32 serves to anchor the insert 27 within the passageway 31.

This modification is otherwise of the same structure and functions in the same manner as the modification of Figs. 1 and 2, i. e., the compressed condition of flanges 33 and 34 of the casing 25 when the valve is assembled in the rim 18 to serve to effect a fluid-tight seal between the casing 25 and the shank of the insert 27 and between the rim 18 and the casing 25. The flange 29 is preferably made larger than the groove 32 so that the sealing between the casing 25 and the insert 27 at this point is enhanced.

This modified insert 27 of Figs. 3 and 4 with its single flange 29, is much cheaper to manufacture and may be readily molded from a suitable rigid plastic material.

While the valve assembly of the present invention has been described above for use with a tubeless tire and rim assembly, it is to be understood that it can be used on other types of articles.

It is to be further understood that the above description and accompanying drawings are for the purpose of illustration only and not by way of limitation and changes and modifications may be made therein without departing from the spirit and the scope of the invention.

Having thus described our invention, what we claim and desire to protect by Letters Patent is:

1. In combination, a rim having a valve stem opening therethrough and a valve stem assembly in said opening, said valve stem assembly including an elastic rubber casing having an outer diameter substantially greater than the diameter of said valve stem opening through the rim and having a circumferentially extending groove formed in the exterior surface thereof intermediate its ends into which the edge of said rim surrounding said opening extends, said groove being sufficiently deep that the base of said groove clears the edge of said valve stem opening through the rim whereby the casing is subjected to substantially no radial compression by the edge of said rim surrounding said opening through the rim, a rigid ring of substantial thickness seated in said groove and engaging at one side the surface of the rim surrounding said opening and at the other side one sidewall of said groove, the combined thickness of said ring and rim being substantially greater than the width of said groove whereby the casing is axially stretched and the ends of said casing are placed under compression, said casing having an axially extending passageway therethrough, and a rigid tubular member adapted to receive a check valve received in said passageway, said rigid tubular member having an outwardly extending flange, said passageway through said casing having an annular groove formed in the surface thereof into which said flange on said tubular member is received to anchor said tubular member within said passageway, the compressed condition of the ends of said casing serving to effect a fluid-tight seal between the casing and the rim and the casing and the tubular member.

2. A valve assembly comprising, an elastic rubber casing having an axially extending passageway therethrough and having a circumferentially extending groove formed in the exterior surface thereof intermediate its ends, a rigid ring of substantial axial thickness seated in said groove, said ring serving to axially stretch said casing when the valve is inserted in a valve opening in a container wall with the edge of the valve opening extending into said groove, and a rigid elongated tubular member extending through said passageway, said tubular member having longitudinally spaced outwardly extending flanges which engage the surfaces of the casing surrounding the opposite ends of said passageway.

3. In combination, a rim having a valve stem opening therethrough and a valve stem assembly inserted in said opening, said valve stem assembly including an elastic rubber casing having an outer diameter substantially greater than the diameter of said opening through the rim and having a circumferentially extending groove formed in the exterior surface thereof intermediate its ends into which the edge of said opening extends, a rigid ring seated in said groove, the combined thickness of said ring and said rim being substantially greater than the width of said groove whereby said casing is axially stretched and the ends thereof placed under compression, said casing having an axially extending passageway therethrough, and a tubular member adapted to receive a check valve extending through said passageway, said tubular member having longitudinally spaced outwardly extending flanges which engage the outer surfaces of the casing surrounding the opposite ends of said passageway, the compressed condition of the ends of the casing serving to effect a fluid-tight seal between the casing and the rim and the casing and the tubular member.

4. In combination, a rim having a valve stem opening therethrough and a valve stem assembly in said opening, said valve stem assembly including an elastic rubber casing having an outer diameter substantially greater than the diameter of said valve stem opening through the rim and having a circumferentially extending groove formed in the exterior surface thereof intermediate its ends into which the edge of said opening extends, said groove being sufficiently deep that the base of said groove clears the edge of said valve stem opening through said rim whereby the casing is subjected to substantially no radial compression by the edge of said opening through the rim, a rigid ring of substantial thickness seated in said groove and engaging at one side the surface of the rim surrounding said opening, and at the other side one side wall of said groove, the combined thickness of said ring and rim being substantially greater than the width of said groove whereby the casing is axially stretched and the ends of said casing are placed under compression, said casing having an axially extending passageway therethrough, and a tubular member adapted to receive a check valve extending through said passageway, said tubular member having longitudinally spaced outwardly extending flanges which engage the outer surface of the casing surrounding the opposite ends of said passageway, the compressed condition of the ends of the casing serving to effect a fluid-tight seal between the casing and the rim and the casing and the tubular member.

5. A valve assembly comprising, an elastic rubber casing having an axially extending passageway therethrough and having a circumferentially extending groove in the exterior surface thereof intermediate its ends, a rigid ring of substantial axial thickness seated in said groove, said ring serving to axially stretch said casing when the valve is inserted in a valve opening in a container wall with the edge of the valve opening extending into said groove, and a rigid elongated tubular member extending through said passageway through the casing, said tubular member having axially spaced outwardly extending flanges which engage the outer surface of the casing surrounding the opposite ends of said passageway, said tubular member having a diameter in excess of the diameter of said passageway, and said passageway being larger at one end thereof to facilitate the insertion of said tubular member therethrough.

6. A valve assembly comprising, an elastic rubber casing having an axially extending passageway therethrough and having a circumferentially extending groove formed in the exterior surface thereof intermediate its ends, a rigid ring of substantial axial thickness seated in said groove, said ring serving to axially stretch said casing when the valve is inserted in a valve opening in a container wall with the edge of the valve opening extending into said groove but spaced from the base thereof, and a rigid elongated tubular member extending within said passageway, said tubular member having means thereon engaging said casing and anchoring said tubular member within said passageway, said tubular member having means in the interior thereof for securing a check valve therein.

7. In combination, a rim having a valve stem opening therethrough and a valve stem assembly in said opening, said valve stem assembly including an elastic rubber casing having an outer diameter substantially greater than the diameter of said valve stem opening through the rim and having a circumferentially extending groove formed in the exterior surface thereof intermediate its ends into which the edge of said rim surrounding said opening extends, said groove being sufficiently deep that the base of said groove clears the edge of said valve stem opening through the rim whereby said casing is subjected to substantially no radial compression by the edge of said rim surrounding said opening, a rigid ring of substantial thickness seated in said groove and engaging at one side the surface of the rim surrounding said opening and at the other side one sidewall of said groove, the combined thickness of said ring and rim being substantially greater than the width of said groove whereby the casing is axially stretched and the ends of said casing are placed under compression, said casing having an axially extending passageway therethrough, and a rigid tubular member adapted to receive a check valve received in said passageway, said rigid tubular member having means thereon engaging said casing and anchoring said tubular member within said passageway, the compressed condition of the ends of the casing serving to effect a fluid-tight seal between the casing and the rim and the casing and the tubular member.

References Cited in the file of this patent

UNITED STATES PATENTS

| | | |
|---|---|---|
| 1,010,592 | Cole | Dec. 5, 1911 |
| 1,896,028 | Burvenick | Jan. 31, 1933 |
| 2,225,472 | Franklin | Dec. 17, 1940 |
| 2,309,786 | Porter | Feb. 2, 1943 |
| 2,585,286 | Tubbs | Feb. 12, 1952 |
| 2,634,785 | Tubbs | Apr. 14, 1953 |
| 2,769,476 | Herzegh et al. | Nov. 6, 1956 |